United States Patent [19]
Smith et al.

[11] Patent Number: 5,763,062
[45] Date of Patent: Jun. 9, 1998

[54] IONOMER RESIN FILMS AND LAMINATES THEREOF

[75] Inventors: W. Novis Smith, Philadelphia; Nelson Bolton, Trumbauersville, both of Pa.

[73] Assignee: Artistic Glass Products Company, Trumbauersville, Pa.

[21] Appl. No.: 745,879

[22] Filed: Nov. 8, 1996

[51] Int. Cl.$^6$ ............................. B32B 7/02; B32B 17/10
[52] U.S. Cl. .................... 428/215; 428/213; 428/412; 428/441; 428/442
[58] Field of Search ...................... 428/213, 215, 428/412, 441, 442

[56] References Cited

U.S. PATENT DOCUMENTS 4,668,574   5/1987   Bolton et al. ............................ 428/339

Primary Examiner—D. S. Nakarani
Attorney, Agent, or Firm—John Lezdey

[57] ABSTRACT

The present inventions teaches an optically transparent film or sheet which is greater than or equal to 0.5 mm in thickness and includes an extrudable ionomer resin which comprises a carboxylic acid polymer and which is essentially free of amines. The ionomer resin film can be used alone or in a lamination with polycarbonate or glass. In certain embodiments, it is preferable to partially or fully neutralize the acid polymer with a metal cation.

19 Claims, No Drawings

IONOMER RESIN FILMS AND LAMINATES THEREOF

BACKGROUND OF THE INVENTION

1. Field of the Invention

This invention relates to ionomer resins and transparent ionomer resin films. In particular, the invention relates to individual sheets of ionomer resin films and ionomer resin films for use alone or in laminates, including laminated glass, and further relates to ionomer resins which are neutralized with a metal cation.

2. Description of the Prior Art

Safety glass can be reinforced by lamination with an inner layer of polycarbonate. The resulting lamination, however, is impractical for two principal reasons. First, there is insufficient bond strength when polycarbonate is bonded directly to glass. Second, and more importantly polycarbonate and glass have different co-efficients of thermal expansion. In safety glass laminates having polycarbonate bonded directly to glass, the polycarbonate can crack and craze on cooling from the temperature necessary to bond the two together because of the different thermal expansion co-efficients of the components.

Initial attempts to solve these problems involved interposing additional interlayers of polyvinyl butyral (PVB) between the polycarbonate and the glass. However, adhesion between the polycarbonate and the glass with the PVB proved inadequate unless a plasticizer was also used in the PVB. Moreover, even when a plasticizer was used it often caused the polycarbonate to develop stress cracks, which resulted in low light transmission properties. Some of these problems were resolved by using the laminated safety glass described in U.S. Pat. No. 3,888,032, which is herein incorporated by reference, which has achieved wide commercial success. The '032 laminate includes polycarbonate reinforced glass wherein the polycarbonate and glass are bonded to one another by an interlayer of polyurethane. Polyurethane provides sufficient adhesion to glass and to the polycarbonate and no stress cracking or cloudiness develops in the product.

Despite the commercial success of the polyurethane laminated product, there has been a continuing effort to develop less expensive products, particularly since polyurethane is an expensive component. Polyurethane also does not have the high impact strength of polycarbonate. To solve this problem, the present invention teaches a low haze transparent article comprising an ionomer resin, with and without layers of polycarbonates, and other reinforcing transparent plastics, which is considerably less expensive than the polyurethane laminates, yet which at the same time is every bit as satisfactory, if not more so, with regard to adhesion, strength and clarity. Moreover, the ionomer has significantly higher impact resistance than polyurethane and about equal impact resistance in comparison to polycarbonate. This means that the low haze ionomer taught by the present invention can be used either with or without polycarbonate and still provide high impact transparencies.

This invention describes the use of a class of polymeric compositions for the manufacture of optically transparent windows, transparencies and impact resistant windows either singularly or in combination with other transparent materials such as optical grade glass, polycarbonate, acrylic, polyester, and fluorocarbon films. Unlike the prior art compositions which develop more haze as the thickness increases due to slower cooling of the laminate after the heated lamination cycle which permits crystallites to form in the plastic layer, the polymers taught by the present invention can be used in thicknesses of greater than or equal to 0.5 mm when laminated or used alone and still provide a low haze product. Surprisingly, these polymers can also provide low haze products at thicknesses of greater than 0.75 mm.

In the specification and claims of this patent, the terms "ionomer" and "ionomer resin" mean an extrudable resin comprising ionically crosslinked ethylene-methacrylic acid and ethylene-acrylic acid copolymers. Properties which distinguish these ionomer resins from other polyolefin heat-seal polymers are high clarity, high impact resistance, low haze in lamination, tear resistance, abrasion resistance, solid-state toughness and resistance to oil and fat permeation. The starting ionomer resins are generally available as either a partially neutralized sodium, lithium or zinc ionomer and are available in a wide variety of grades. However, as will be discussed hereafter, the partially esterified or unneutralized acid forms of the resin are also adaptable to the present invention. Amine ionomers have also been produced. All grades of ionomer resins generally exhibit the properties noted above when compared to heat sealed polymers. However, sodium ionomers are known for exceptional toughness and resistance to fats and oils, while zinc ionomers exhibit outstanding adhesion to unprimed foil and possess excellent chemical resistance. Moreover, sodium ionomers have proved to provide the best clarity, while zinc ionomers sometimes result in hazy clarity.

Various grades of ionomer resins are available for extrusion coatings and film extrusion. The term "film" includes single layers and laminates. It is also known that ionomer resins can be co-extruded with other plastic resins and exhibit adhesion to other polyolefin resins, nylon resins and coextrudable adhesive resins often used as bonding layers in multi-ply coextruded structures. A very wide variety of partially neutralized extrudable ionomer resins are manufactured by E.I. DuPont de Nemours and Company under the registered trademark "SURLYN®". Ionomer resins have been used primarily in the area of packaging for foods, liquids and pharmaceuticals, as well as in certain industrial applications including lightweight sails, bonded cable sheathes, roof underlayments, flame retardant products, and other thin layer applications.

In most applications, ionomer resins are offered as a superior substitute for polyethylene. U.S. Pat. No. 4,663,228 to Bolton et al., which is hereby incorporated by reference, was the first prior art reference to suggest that ionomer resins along with a polyamine could be used for reinforcing glass layers in order to form a laminated safety glass. The '228 patent discloses that ionomer resins could be generally substituted for polyurethanes, acrylics and polycarbonates. Moreover, prior to the '228 patent it had been generally assumed that ionomer resin films thicker than 0.5 mm could not be obtained which still maintained optical clarity of at least 60% light transmission, which translates into a haze reading of less than 4.0%. Moreover, acceptable haze for transparencies should be preferably less than 3.5% and most preferably, less than 1%.

Layers of ionomer resins can be formed by casting, forming blown film or extrusion, the latter one being preferred for process advantages. However, once formed, there are no significant differences between cast, blown and extruded layers. When the ionomer resin layer is sufficiently thick, polycarbonate layers can be eliminated altogether in forming layered materials. And, if the ionomer layer can be made sufficiently thick without interfering with optical clarity, an unsupported film can be provided. The present invention teaches a sufficiently thick ionomer resin layer which can be used alone or in a laminate.

Ionomer resins have several advantages over polyurethane. Polyurethane is difficult to manufacture, expensive and hard to fabricate. Also, polyurethane frequently does not possess sufficient clarity or impact resistance for use in windshields and the like. By contrast, ionomer resin films can be easily extruded to desired thicknesses. Furthermore, ionomer resin films cost about one-half of the material cost of polyurethane. Moreover, ionomer resins have demonstrated excellent adhesion characteristics to glass and polycarbonates, as well as better resistance to lower temperatures. In the preferred embodiments, the surface to which the ionomer resin is bonded may be primed to get good adhesion, as is the case with polyurethane, but to a lesser degree. Preferably, silane coupling agents are suitable primers.

The prior art ionomer resin layers, for example, as disclosed in the '228 patent, cannot make low haze, 0.5 mm thick optically transparent films or laminates without the inclusion of an polyamine. While ionomers containing polyamines offer a viable alternative, there is a strong need in the industry to eliminate their use due to their high cost and difficulty of handling and extruding.

Therefore, the primary object of this present invention is to provide an optically transparent ionomer resin which overcomes the prior art limitations and disadvantages.

It is another object of the invention to provide an ionomer resin that is a partially or totally neutralized carboxylic acid containing hydrocarbon copolymer which is easily extruded.

It is a further object of this invention to provide a laminated article composed of glass and ionomer resins, and depending upon the application, laminates of glass, ionomer resin and polycarbonate or other high impact transparent plastics as well. The laminated articles have all of the advantages and positive features of laminates of glass and polyurethane and polycarbonate, but are significantly less expensive to produce and have other enhanced features such as increased clarity and more stability to delamination.

It is yet another object of this invention to provide a laminated article of glass, ionomer resin and high impact plastic which has good adhesion and which is transparent and resistant to breakage.

It is still another object of this invention to provide a laminated article of glass, ionomer resin and high impact plastic which has good strength properties over a wide temperature range.

And still further, it is an object of this invention to provide a non-amine containing ionomer film of thicker dimensions than previously possible without causing hazing or disruption of the clarity of light transmission through the film.

SUMMARY OF THE INVENTION

These and other objects of this invention are accomplished by providing an extrudable ionomer resin film which can be used alone or in a lamination to a sheet of glass and/or high plastic transparency, such as acrylic, in thicknesses of greater than 0.50 mm. The preferable ionomer resin film is an ionically crosslinked ethylene-methacrylic acid copolymer. The laminated articles may also comprise a sheet of plastic laminated to the ionomer resin film opposite the glass or plastic ionomer laminates themselves. The laminated articles may further comprise the ionomer resin film sandwiched between two sheets of glass. Furthermore, the laminated articles may include a sheet of ionomer-resin film sandwiched between a sheet of glass and a sheet of plastic or the ionomer resin film sandwiched between a sheet of glass and a sheet of metal. The laminated articles may also comprise any number of lamina of glass sandwiched with a lamina of an ionomer resin, the resultant laminate having glass as the outer lamina. Moreover, the multi-layer laminate of glass and ionomer resin may have a glass/ionomer configuration, with glass as the exterior layer and the ionomer resin as the interior layer, the interior ionomer resin layer having further a polyester film layer laminated thereto on the side opposite the glass layer.

The present invention teaches a low haze transparent article, e.g., one with less than 4% haze, which includes an extrudable ionomer resin film or sheet that is at least 0.5 mm thick. The ionomer resin has a carboxylic acid content of between about 17% and 40% by weight and is essentially free of any polyamines. Advantageously, the ionomer resin includes a hydrocarbon carboxylic acid copolymer which may be unneutralized. Certain preferred embodiments require partial or full neutralization of the acid polymer, preferably, at least 20% neutralized. The present invention is especially adaptable to different applications as it can be used alone or in laminations with polycarbonate and glass.

The advantages and objects of the present invention will become evident by referring to the following description and claims.

DESCRIPTION OF THE PREFERRED EMBODIMENTS

When films of the ionomers of copolymers of ethylene-methacrylic acid or ethylene-acrylic acid have previously been formed, they usually only retained their clarity when formed in very thin films. Thin films help insure the clarity of the films because the thin layered ionomer films can be cooled quickly after being melted and formed. Rapid cooling prevents the formation of finely dispersed crystallites from being formed, which would create a hazy film and result in poor light transmission film properties. In thicker films and sheets of the ionomer, the degree of clarity becomes an important problem since a larger mass of the film cools more slowly which allows the crystallites a greater opportunity to form and grow. These crystallites create haze and opacity. In fact, sheets of 1 mm or thicker are not obtained with clarity under normal cooling conditions. Furthermore, prior to the present invention, sheets of 0.5 mm or thicker which were processed under normal cooling conditions resulted in undesirable haze readings of greater than 4%. Moreover, the haze readings were significantly worse, and therefore, even more undesirable, in sheets of 0.75 mm or thicker. Rapid quenching of the thick layers can help, but rapid quenching becomes impossible or at least very difficult if the ionomer sheet is laminated or is a part of a larger object. When transparent windshields are made from ionomer films, some means is required in order to prevent the crystallites from forming and creating the resulting haze in the film during processing and cooling.

The present invention teaches that extrudable ionomer resin films such as Surlyn®, which contain between 17% and 40% of methacrylic acid or other ionomer resins containing acrylic acid exhibit low haze, less than 4%, when used in sheets of greater than 0.5 mm. As mentioned above, such low haze is a requirement when using plastics for optical transparencies and is not seen in the prior art in thicknesses that are greater than 0.5 mm. Normally, ionomers which are extruded into thick sheet sections, e.g., greater than 0.3 mm, will undergo partial crystallization of the polyethylene or polyolefin segment of the ionomer copolymer. This partial crystallization produces various degrees of haze on cooling which results in poor optical qualities. In order to reduce or eliminate this crystallization of the polyolefin segment, the glass transition temperature ($T_g$) of the polymer must be raised closer to or above the temperature where crystallization starts because the crystallization temperature is related to the melting point. An elevation in the $T_g$ in the ionomer plastics will result in lower haze.

Previously, this was accomplished by the addition of primary diamines and polyamines as discussed in the '228 patent. However, the use of amines are expensive, odorous, hard to control and make the extrusion process more complicated. To overcome these limitations, we have found that increasing the crosslink density by using an ionomer resin with an increased carboxyl content contributes to increasing the glass transition temperature above the crystallization temperature, which results in the formation of a low haze film, generally less than 4% even when the sections are greater then 0.5 mm. Partial or full neutralization of the carboxylic acid can also contribute to increasing the glass transition temperature.

It is also important that the films used in this invention are extruded. Extrusion provides total homogeneity prior to cool down which results in a more uniform and consistent product. Previous prior art attempts to produce a milled product did not result in achieving sufficient temperatures to produce a totally melted resin which is necessary for total homogeneity of the resin. Therefore, the milled product required a high $T_g$ to achieve low haze on cooling. Accordingly, milling cannot provide a full reaction at normal operating temperatures because of the high viscosity of the reactants. The physical shearing forces of milling cannot break the ionic bonds at normal operating temperatures. In contrast, the extrudable ionomer resins contemplated by the present invention provide a full reaction that is easy to accomplish at the normal operating high temperatures (above 150° C.). Advantageously, laminations are done at temperatures higher than or equal to 135° C.

Furthermore, increasing the crosslink density by using an ionomer with increased carboxyl content along with, in certain preferred embodiments, increasing the extent of neutralization from 20% to about 75% will contribute to increasing the glass transition above the crystallization temperature. Thus, the formation of low haze ionomer sheets is possible even when the sections are greater than 0.5 mm thick. The thicker the section, the slower it cools, and therefore, the more time there is for crystallization of the polyolefin segments in the polymer to produce haze before the temperature goes below the melting point. When the temperature goes below the glass transition point, the formation of crystallites cannot proceed because the resin is frozen into a "glass". The higher the $T_g$ is above the melting point, the less the polyolefin crystallites can form. Therefore, although low haze can sometimes be achieved on thin films of various ionomers, we have found that when the methacrylic acid content, or the acrylic acid content, is above 17%, the sheets of ionomers that can be formed with low haze can be made thicker and therefore, more suitable for optical transparencies.

The carboxylic acid monomer content in the ionomer resin is preferably between 17% and 40% by weight. The ionomer resin film or sheet is essentially free of amines and can be used alone or in a lamination in thickness of up to 0.5 mm or greater and still exhibit low haze properties of less than 4% haze. Preferably, the ionomer resin includes a partially or fully neutralized hydrocarbon carboxylic acid copolymer. The acid polymer is advantageously neutralized by a metal cation. Most preferably, the neutralization is at least 20% complete.

Suitable metal cations for neutralization are monovalent cations such as lithium, sodium, and potassium. Divalent cations such as magnesium, calcium, and zinc may also be used, alone or in combination with the monovalent cations, but often the metal carbonate or oxide is present as a haze producing impurity. Finally, metal hydroxides and metal acetates have proven adequate in neutralizing these acid polymers. With certain acid polymers, e.g., Nucrel® (unneutralized ionomer of ethylene and methacrylic acid), some neutralization is important to increase the physical properties over that of the unneutralized ionomer copolymer.

Preferably, the ionomer resins contain carboxylic acids such as copolymers and terpolymers of ethylene-methacrylic acid, ethylene-acrylic acid, polymethacrylic acid, polyacrylic acid and mixtures thereof. Moreover, the ionomer resin is preferably prepared from monomers, copolymers and terpolymers of the same carboxylic acids. Also preferable, is the inclusion of a copolymerized olefin in the ionomer resin.

Furthermore, we have also found several advantages in esterifying, at least partially, the ionomer resin. The partially esterified acid polymer preferably has the following general formula:

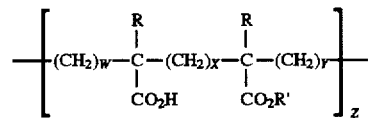

Wherein:
R=H or $CH_3$;
R'=methyl, ethyl, propyl, butyl or octyl;
W=at least 1;
X=at least 1;
Y=at least 1; and
Z=at least 10

Certain embodiments of the invention can advantageously utilize a variety of partially neutralized esterified acid polymers such as polyethyleneacrylic acid/ester and polyethylenemethacrylic acid/ester.

Finally, other embodiments of the invention advantageously mix an unneutralized ionomer resin and a neutralized ionomer resin. The ionomer resin is extrudable in a film or sheet which can be used alone or in a lamination. In laminations, the ionomer resin is preferably laminated to a sheet of polycarbonate or primed or unprimed glass. Such a lamination can be further modified by a second sheet of polycarbonate or primed or unprimed glass. Preferably, each polycarbonate or glass sheet has a thickness of at least about 0.7 mm. Along with the ionomer resin sheet, the total lamination is about 2 mm thick. In fact, we have found that exceptionally thick laminations of over 8 mm, which are especially useful in automotive glass applications, can be produced with the ionomer resins of the present invention. For example, one low haze lamination was produced with an ionomer resin sheet of at least 4 mm thick and two polycarbonate or glass sheets, each one having a thickness of at least 2 mm.

The present invention encompasses laminating transparent glass and plastic sheets together. The ionomer resins are also used for laminating transparent polycarbonate or acrylic sheets to glass or other transparent structures. Furthermore, the ionomer resins can be used alone in optically transparent sheets at thicknesses greater than 220 mm as windows, bullet resistant shields and other high impact protective transparencies.

Following are some examples of the present invention:

1. A 0.75 mm thick sheet of the plastic to be tested is cut into a 150 mm by 150 mm square and placed between two pieces of standard soda lime window glass (2.7 mm×150 mm×150 mm) forming a laminated sandwich. All surfaces of these plates have been previously cleaned and examined carefully to ensure that there is no dirt, other contaminants or lint present. The three-layered sandwich is then placed into a heat resistant vacuum bag and fitted with a vacuum tube and pulled down to 28 inches to mercury. The evacuated bag containing the sandwich is then placed into an autoclave which is pressured on the outside of the bag to 14 atmospheres. The autoclave is then heated to 110° C. over 30 minutes while maintaining pressure on the outside of the bagged laminate while vacuum is still maintained on the inside of the vacuum bag by means of the vacuum hose. The autoclave is held at 110° C. for an additional 30 minutes and then the heat is cut off. The autoclave is then placed on a cooling cycle and then opened after 30 minutes. The bagged laminate is then removed and the bag is removed. The three-layered laminate is cleaned on the outside in case any contamination of the outside glass surfaces occurred during handling. This laminate is then placed into a Byk-Gardner Haze Guard Plus Model #4725 meter for determining haze and transmission in transparent sheets. This meter utilizes white light and checks the percent of light dispersion as haze. The percent haze is then recorded for the particular plastic sheet which has been examined. This test shows the expected amount of haze to be formed in commercial applications utilizing plastic sheets to laminate glass and other plastic sheets together or when the plastic sheet itself is used in thicker sections.

2. To produce a glass-plastic-glass laminate, two pieces of glass are cut to a predetermined size and an alike sized plastic interlayer made of Surlyn® 8140 is cut to match the glass. The interlayer is placed between the two sheets of glass which have had the surface adjacent to the interlayer primed with a silane priming agent (e.g., Z-6020 manufactured by Dow). The three-layered sandwich is then bagged in a heat resistant vacuum bag. After a vacuum has been accomplished, the bagged laminate is placed in an autoclave. A program to accomplish a first phase is instituted which ramps the autoclave from ambient temperature to about 140° C. A second phase begins in which soaking the sandwich at a chosen temperature is accomplished to allow a softening and melting of the interlayer. A third phase is a ramp down to ambient temperature. During these three phases of production the autoclave is pressurized with either compressed air or a gas such as nitrogen at 3.5–10 atmospheres of pressure. When the autoclave has been depressurized and the environment in the autoclave has been reduced in temperature to ambient temperature the laminate can be removed and unbagged. The resulting laminate has a haze reading of less than 3%.

3. Surlyn® 8140 which contains about 19% methacrylic acid copolymer and is about 75% neutralized with a sodium cation was extruded in a sheet of 1 mm and laminated to itself to form a 2 mm thick panel. In another instance it was further laminated to a 1 mm thick glass to form an overall 3 mm thick transparency. In both cases, the haze measured was less than 3% and highly suitable for optical transparencies.

4. Surlyn® 8920, which contains about 15% methacrylic acid copolymer and is about 75% neutralized with a sodium cation, was extruded and laminated in the same manner as described in Example 3 and produced hazy sheets which had haze measurements in excess of 4% which is unsuitable for transparency applications.

5. Surlyn® 8140 and Nucrel® 960 were mixed 50/50 by weight and extruded to produce a resulting polymer sheet containing about 17% acid copolymer groups and 35% sodium cation neutralization. The lamination of this material was prepared in the same manner as in Example 3 and resulted in thick transparencies with haze less than 3.5% which is suitable for optical transparency uses.

6. Suryln® 8140 and 6% lithium acetate was added during extrusion to complete the neutralization. Upon lamination in the same manner as in Example 3, the transparencies exhibited less than 1% haze which is excellent optical transparency.

7. Various samples were prepared in a twin screw extruder (Welding Engineers), 30:1, 18 mm diameter. The resin pellets were mixed and fed into the extruder by a vibrating screen. If any powder additives or reactants were added, such as metal acetates, hydroxides, etc., these were dissolved in a solvent and then mixed with the resin pellets and dried. If a liquid was needed, it was added through a separate port further along the barrel. The extruder was also equipped with a vent port to release any moisture or gases that were generated. The various resins or reacted/mixed resins were extruded into a sheet about 400 mm wide and about 0.5 mm to about 0.8 mm thick for evaluation of properties. In some cases the mixed resin was extruded into strips or wire and then cut into pellets and then reextruded into sheets.

The extruded sheets were evaluated after 24 hours for haze on a hazometer and laminated between two pieces of 2.7 mm soda lime window glass in a autoclave and then checked for haze again. This latter lamination test shows the effect of slower cooling through the glass transition point which occurs with the increased mass resulting from the additional glass or plastic being bonded in a lamination. This test demonstrates practical lamination behavior for transparencies. As discussed earlier, with slower cooling, there is more time for crystallization to occur which causes haze.

The following Table I shows various films which were made and tested:

TABLE 1

| MATERIAL | % NEUT | % ACID | % Haze |
|---|---|---|---|
| S 8920 | 75 | 15 | 4.0 |
| N 960 | 0 | 15 | 8.0 |
| S 8140 | 75 | 19 | 0.8 |
| S 8140 + 6% Lithium Acetate | 100 | 19 | 0.8 |
| 50% S 8140 50% S 8920 | 75 | 17 | 2.8 |
| 50% S 8140 50% N 960 | 38 | 17 | 3.0 |
| Prior Art S 8920 + 3% Diamine | 100 | 15 | 0.5 | wherein
S = Surlyn ®
N = Nucrel ®
M = Methacrylic Acid
A = Acrylic Acid

All films are approximately 0.7 mm thick.

Although the invention has been described herein with a certain degree of particularity, it is understood that the present disclosure has been made only by way of example and that numerous changes in details of construction and the combination and arrangement of ports may be resorted to without departing from the spirit and scope of the invention.

What is claimed is:

1. A transparent article having a haze of less than 4%, said transparent article comprising an extruded ionomer resin film or sheet having a carboxylic acid content of between about 17% and 40% by weight, said ionomer resin being essentially free of amines and having a thickness of at least about 0.50 mm.

2. The transparent article according to claim 1, wherein said ionomer resin comprises a partially or fully neutralized hydrocarbon carboxylic acid copolymer.

3. The transparent article according to claim 2, wherein said ionomer resin is partially or fully neutralized by a metal cation.

4. The transparent article according to claim 2, wherein said ionomer resin is at least 20% neutralized.

5. The transparent article according to claim 3, wherein said metal cation comprises a monovalent cation selected from the group consisting of lithium, sodium and potassium.

6. The transparent article according to claim 5, further including a second metal cation comprising a divalent cation selected from the group consisting of magnesium, calcium and zinc.

7. The transparent article according to claim 3, wherein said metal cation is derived from a metal hydroxide or a metal acetate.

8. The transparent article according to claim 1, wherein said ionomer resin comprises a carboxylic acid copolymer or terpolymer selected from the group consisting of ethylene-methacrylic acid, ethylene-acrylic acid, and mixtures thereof.

9. The transparent article according to claim 1, wherein said ionomer resin is prepared from monomers, copolymers or terpolymers selected from the group consisting of ethylene-acrylic acid, ethylene-methacrylic acid, and mixtures thereof.

10. The transparent article according to claim 1, wherein said ionomer resin comprises a mixture of an unneutralized ionomer resin and a neutralized ionomer resin.

11. The transparent article according to claim 8, wherein said ionomer resin further comprises a copolymerized olefin.

12. The transparent article according to claim 1, wherein said ionomer resin is laminated to a sheet of polycarbonate or primed or unprimed glass.

13. The transparent article according to claim 12, further comprising a second sheet of polycarbonate or primed or unprimed glass which is laminated to said ionomer resin.

14. The transparent article according to claim 13, wherein each of said polycarbonate or glass sheets has a thickness of at least about 0.7 mm.

15. The transparent article according to claim 13, wherein each of said polycarbonate or glass sheets has a thickness of at least about 2.0 mm and said ionomer resin has a thickness of at least about 4.0 mm.

16. The transparent article according to claim 1, wherein said ionomer resin is at least partially esterified.

17. The transparent article according to claim 16, wherein said partially esterified acid polymer has the general formula:

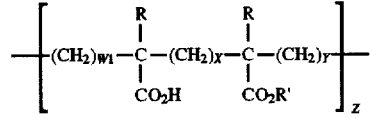

Wherein:
R=H or $CH_3$;
R'=methyl, ethyl, propyl, butyl or octyl;
W=at least 1;
X=at least 1;
Y=at least 1; and
Z=at least 10.

18. The transparent article according to claim 16, wherein said ionomer resin comprises a partially neutralized acid polymer selected from the group consisting of polyethyleneacrylic acid/ester and polyethylenemethacrylic acid/ester.

19. The transparent article according to claim 1, wherein said thickness of said ionomer resin comprises at least about 0.75 mm.